United States Patent [19]
Todd

[11] Patent Number: 5,315,461
[45] Date of Patent: May 24, 1994

[54] METHOD AND APPARATUS FOR ELIMINATING THE EFFECT OF STAGGERWRAP ON TAPE GUIDANCE

[75] Inventor: Christian A. Todd, Thornton, Colo.

[73] Assignee: Storage Technology Corporation, Louisville, Colo.

[21] Appl. No.: 904,978

[22] Filed: Jun. 26, 1992

[51] Int. Cl.⁵ .............................................. G11B 15/61
[52] U.S. Cl. ...................................... 360/90; 226/197
[58] Field of Search ........................... 360/90, 130.21; 242/200, 201; 226/197, 189

[56] References Cited

U.S. PATENT DOCUMENTS

| | | | |
|---|---|---|---|
| 2,647,750 | 8/1953 | Camras | 360/90 |
| 2,678,173 | 5/1954 | Phelps | 360/90 |
| 3,223,303 | 12/1965 | Hunter | 226/197 |
| 3,309,037 | 3/1967 | Amos | 226/197 X |
| 3,391,399 | 7/1968 | Pendleton | 360/90 |
| 3,979,773 | 9/1976 | Sawazaki | 360/130.21 X |
| 4,788,846 | 12/1988 | Moneta et al. | 226/187 X |

FOREIGN PATENT DOCUMENTS

| | | | |
|---|---|---|---|
| 0211542 | 2/1987 | European Pat. Off. | 360/130.21 |
| 1531147 | 12/1989 | U.S.S.R. | 360/130.21 |

*Primary Examiner*—Richard E. Gluck
*Attorney, Agent, or Firm*—Duft, Graziano & Forest

[57] ABSTRACT

A method and apparatus is disclosed for eliminating the effect of unevenly wound magnetic tape media on the guidance of the media relative to a tape transport read/write head. A first guide is used to axially twist the tape or other media 90 degrees relative to the longitudinal axis of the media being unwound from a tape spool. Another guide is then used to twist the media into to an alignment which is co-planar with a surface of the tape transport read/write head. This procedure eliminates the effect of staggerwrap from the tape spool and allows the spooled media to be more precisely aligned with respect to a desired media path of travel.

7 Claims, 5 Drawing Sheets

METHOD AND APPARATUS FOR ELIMINATING THE EFFECT OF STAGGERWRAP ON TAPE GUIDANCE

FIELD OF THE INVENTION

This invention relates generally to a system using rolled or spooled material or media and, in particular, to a method and apparatus for eliminating the effect of unevenly wound magnetic tape media on a guidance mechanism of the media relative to a tape transport read/write head.

PROBLEM

It is a problem in magnetic tape transports to accurately guide tape media across a tape transport read/write head. One cause of this problem is the fact that media, which is wound onto tape spools, is normally "staggerwrapped". The term "staggerwrap" refers to the situation in which the top and bottom edges of the media are unevenly wound with respect to the top and bottom flanges of a tape spool. Staggerwrap causes the edges of the media to move up and down with respect to a reference edge of the read/write head when the media is unwound from the tape spool.

Staggerwrap is caused by numerous factors, but the net result is to produce media which is wound such that the edges of the media are located at random distances from the top and bottom flanges of the tape spool. If the tape spool is made too narrow in an attempt to force the media into alignment, excessive media wear results from contact between the edges of the media and the tape spool flanges. Furthermore, the up and down motion imparted to the media by the staggerwrap effect also causes excessive wear of elements used to vertically guide the media.

Media misalignment due to staggerwrap becomes more of a problem as more tracks are placed on a given media. As the number of tracks per fixed height (or "width") of a media is increased, the vertical dimension (width) of each track correspondingly decreases. Thus, the tolerances with which the media must be guided vertically relative to a read/write head reference edge become more critical.

An additional guidance problem is incurred with conventional magnetic tape transports which attempt to guide the media in a straight line path. This problem is due to the fact that media (particularly magnetic tape) is inherently stiff in the axis of desired alignment. That is, the media acts like a relatively rigid "beam" in the vertical axis. This produces a "beam effect" which makes it more difficult to properly guide and align the media with respect to the reference edge of a tape transport read/write head.

SOLUTION

These problems are solved and a technical advance achieved in the field by the staggerwrap elimination method and apparatus of this invention. A first media guide is positioned between the tape spool on which is wound and the read/write head. This guide axially twists the media nominally 90 degrees relative to the longitudinal axis of the media as it is unwound from a tape spool. A second guide is positioned between the first guide and the read/write head is used to twist the media back to an alignment co-planar with the surface of a tape transport read/write head. This procedure eliminates the effect of staggerwrap from the tape spool, and allows the spooled media to be more precisely aligned with respect to a desired path of travel. Precisely controlled vertical alignment of the media relative to a reference edge of a tape transport read/write head can thus be achieved.

Elimination of staggerwrap also provides the benefit of reducing both media wear and media guide wear. In addition, the axial twisting of the present invention nullifies the "beam effect" resulting from prior art guide arrangements.

DETAILED DESCRIPTION

Figure 1:
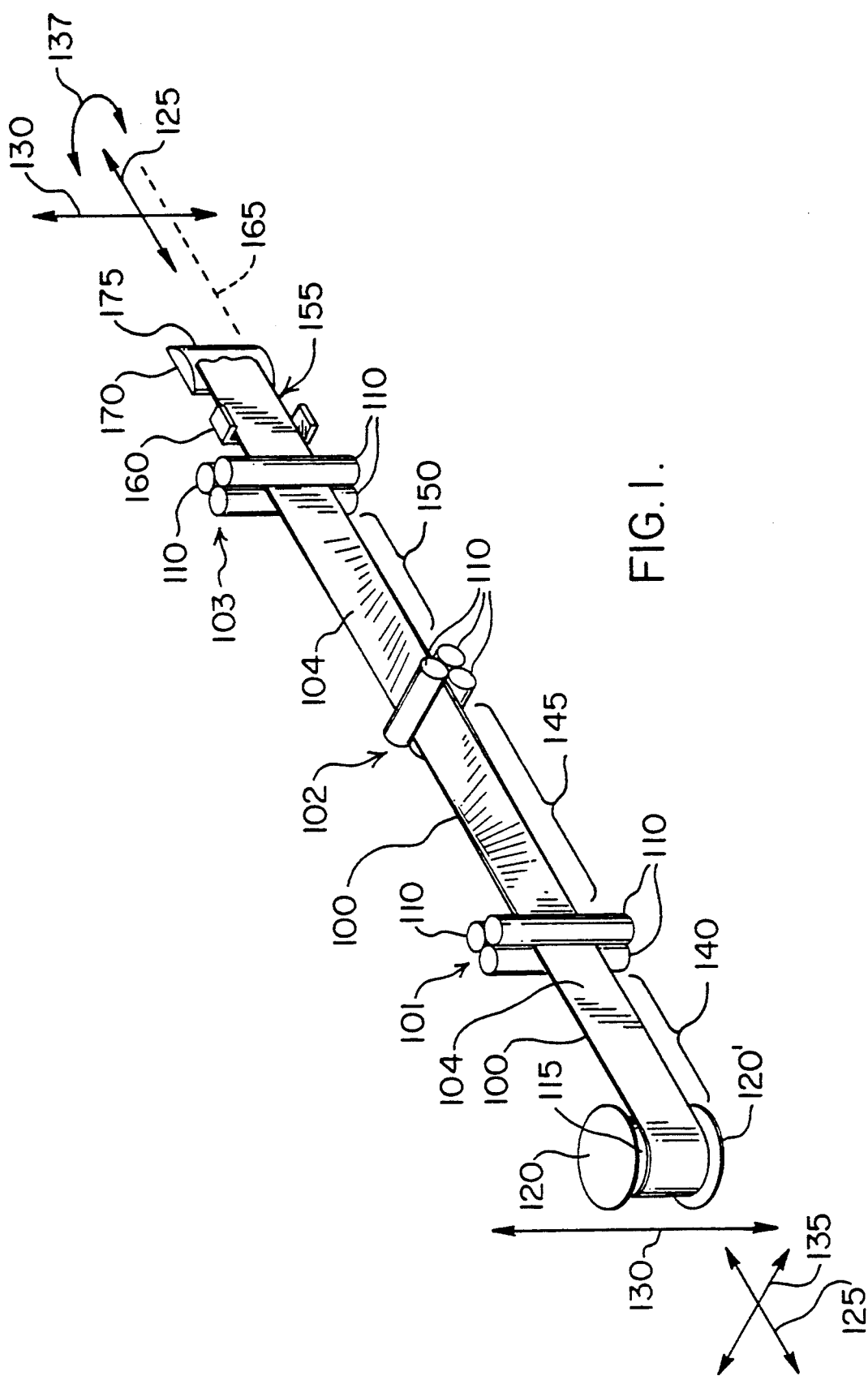
FIG. 1 is a perspective view showing the arrangement of the media guides used in one possible exemplary embodiment of the invention.

FIG. 1 is a perspective view showing the arrangement of media guides ("guides") 101, 102, 103 used in the present invention with relationship to media 100, spool ("tape spool") 115, and a tape transport read/write head 170. The method and apparatus of the present invention function to eliminate the effect of staggerwrap on the alignment of media 100 with respect to a reference edge 165 of read/write head 170 when media 100 is unwound from tape spool 115. It should be noted that the present invention could be used to align any media 100 having a planar surface 104 with respect to a "target surface," such as read/write head 170 across which the media 100 passes.

The term "staggerwrap" refers to the situation in which the top and bottom edges of the media 100 are unevenly wound with respect to the top and bottom flanges, 120, 120' of a tape spool 115. Staggerwrap occurs, for example, when media 100 is wound onto a tape spool 115 at high speed and layers of media 100 float on an air layer trapped between the media layers. The media layers "float" relative to each other until they are sufficiently tensioned against the media 100 already wound around the tape spool 115. This media "floating" results in media 100 being wound so that the edges of media 100 are located at random distances from the top and bottom flanges 120, 120' of the tape spool 115.

When staggerwrapped media 100 is unwound from tape spool 115, the edges of the unevenly wound media 100 move up and down with respect to a given horizontal reference line parallel to the longitudinal axis 125 of the path of travel 125 of media 100. The horizontal reference line is typically a reference edge 165 of the read/write head 170. The up and down movement of media 100 relative to read/write head 170 often results in errors in reading data from media 100 or writing data to media 100.

For the purpose of this document, the path of travel 125 of media 100 includes the axial orientation of the planar surface 104 of media 100 relative to the media longitudinal axis 125, as well as a vertical position of the media 100 in direction 130 relative to reference edge 165 of read/write head 170.

As shown in FIG. 1, each guide 101, 102, 103 comprises a plurality of elements 110 through which the media 100 travels. In the embodiment of FIG. 1, three cylindrical guide elements 110 are arranged in a triangular pattern with media 100 passing between two of the guide elements 110 on one side of media 100 and the third guide element 110 on the other side of the media 100.

Figure 10:
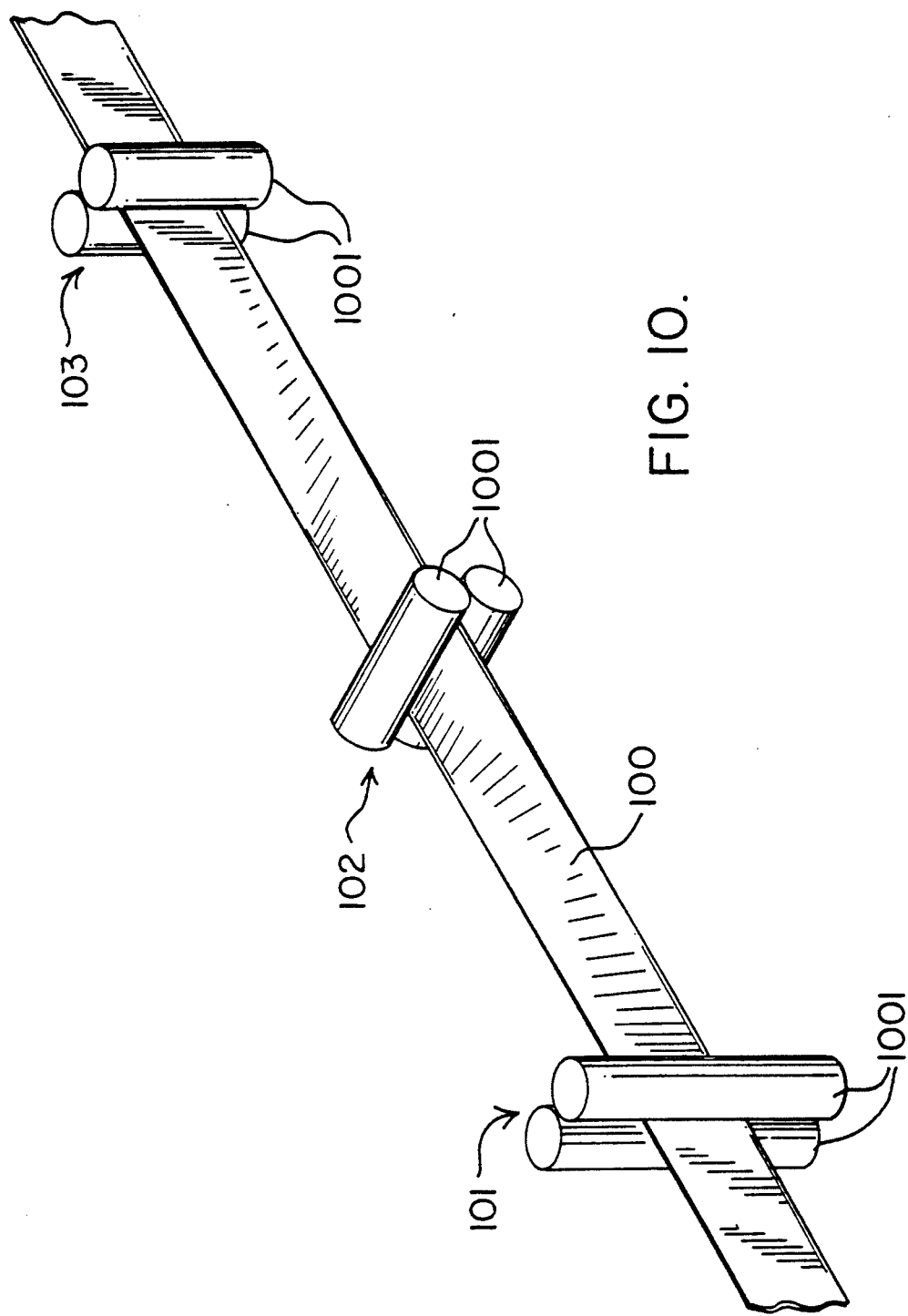
FIG. 10 illustrates an alternative embodiment of the present invention.

FIG. 10 illustrates an alternative embodiment in which two guide elements 1001 are used for each guide 101, 102, 103. In this embodiment, media 100 passes between two guide elements 1001 in each of the guides 101, 102, 103. More than two guide elements per guide could also be employed in another alternative embodiment.

In operation, media 100 is unwound from tape spool 115 at area 140 in an initial axial orientation wherein the surface 104 of the media 100 is typically oriented parallel to direction 130. Media 100 then travels through first guide 101 which stabilizes the media 100 in a horizontal direction 135 orthogonal to the longitudinal axis 125 of the path of travel 125 of the media 100.

After passing through the first guide 101, media 100 then passes through second guide 102 which twists the surface 104 the media 100 approximately 90 degrees axially with respect to the initial axial orientation in area 140 of media surface 104. This twisting of media 100 between guides 101 and 102 occurs in area 145. The distance between guides 101 and 102 is not critical. However, maximizing this distance minimizes edge stresses incurred by the media 100. As media 100 passes through guide 102, surface 104 of media 100 is preferably axially twisted at 90 degrees with respect to the surface 104 of media 100 leaving tape spool 115. The nominal angle of axial twist imparted by guide 102 is 90 degrees, but this angle could be any angle between approximately 45 degrees and 135 degrees.

Media 100 next passes through third guide 103, which twists the media 100, in area 150, 90 degrees axially back to its approximate initial orientation. The distance between guides 102 and 103 is not critical. However, maximizing this distance minimizes edge stresses incurred by the media 100. Media 100 exiting third guide 103 is thus decoupled from any staggerwrap on tape spool 115. This decoupling causes media 100 to be stabilized in a vertical direction 130 with respect to read/write head 170. The angle of axial twist imparted by guide 103 could be an angle between approximately 45 degrees and 135 degrees. The primary function of guide 103 is to axially orient the surface 104 of media 100 parallel to the surface 175 of tape transport read/write head 170.

Media 100 then typically passes through one or two sets of vertical guides 160 which effect final alignment of media surface 104 relative to read/write head surface 175 at area 155. Each vertical guide 160 typically includes a coarse vertical guide 160 which allows the media 100 to move up or down typically 50-60 mils (thousandths of an inch), and a fine vertical guide (not shown) which typically allows only 10-15 mils of vertical media misalignment. Because of the vertical stability imparted to media 100 by second guide 102 and third guide 103, the number of elements 110 in the vertical guide[s] 160 in a given tape transport can be reduced. This reduction in the number of guide elements both simplifies tape transport construction and decreases the tape transport construction cost.

It should be noted that, if desired, the present invention could operate effectively without the first guide 101, because the initial axial orientation of media 100 leaving the tape spool 115 is substantially the same as the orientation imparted by the first guide 101. The first guide 101 is used primarily to stabilize the media in horizontal direction 135, but the tape spool 115 itself can function as first guide 101.

Elimination of staggerwrap also provides the benefits of reducing both media wear and vertical guide 160 wear. Previous attempts to reduce staggerwrap include reducing the distance between the tape spool flanges 120, 120' so that the distance between flanges 120, 120' is only marginally greater than the width of the media 100. Unfortunately, if the tape spool flange 120, 120' spacing is made too narrow in an attempt to force the media 100 into alignment, excessive media wear results from contact between the edges of the media 100 and the tape spool flanges 120, 120'. The present invention eliminates this problem of media wear while using a tape spool 115 having industry standard dimensions.

Elimination of the up and down motion imparted to the media 100 by the staggerwrap effect also reduces wear of guide elements used in the vertical guide(s) 160.

As more tracks are placed on a given width of tape media 100, the tolerances within which media 100 must be guided relative to read/write head 170 become more critical. It is therefore necessary to more precisely align the media 100 with respect to a desired path of travel 125. The present invention decouples the effect of staggerwrap from the alignment of media 100 with respect to a tape transport read/write head reference edge 165. Sufficient alignment control and stabilization of media 100 is thus provided so that the number of tracks can be increased significantly over that of the prior art.

It is important to note that the amount of axial twist imparted to the media 100 by the second and third guides 102, 103 is not critical. Neither the first twist (imparted by second guide 102) nor the second twist (imparted by third guide 103) is required to be 90 degrees for the present invention to function effectively. A range of substantially sufficient axial twisting angles between 45 and 135 degrees could be used to effectively provide the decoupling effect of the present invention. One essential requirement, however, is that the twist imparted to media 100 by third guide 103 must be such that surface 104 of media 100 is axially oriented so as to be essentially co-planar with the surface 175 of the transport read/write head 170.

Although, in a preferred embodiment, media 100 is twisted by guide 103 in an axial direction 137 opposite to the twist imparted by guide 102, media 100 could, in an alternative embodiment, be twisted by both the second and third guides 102, 103 in the same axial direction 137, as long as the final axial orientation of the surface 104 of media 100 is co-planar with respect to the surface of read/write head 170. In this alternative embodiment, read/write head 170 would be rotated 180 degrees about axis 130 relative to the read/write head 170 shown in FIG. 1.

The axial twisting of media 100 also provides the further beneficial effect of eliminating the inherent stiffness ("beam effect") of the media 100 in the axis 130 of desired alignment. This elimination of inherent stiffness of media 100 increases the facility with which the media 100 can be aligned in direction 130 with respect to a reference edge 165 of a tape transport read/write head 170.

Another benefit of the present invention is that stabilization of media 100 occurs regardless of which direction 125 media 100 is moved through the second and third guides 102, 103. The double twisting of media 100 imparted by the second and third guides 102, 103 has the effect of biasing media 100 in a specific vertical direction 130. When media 100 is being unwound from tape spool 115, the media 100 is biased against a given (top or bottom) reference edge 165 of the read/write head 170, depending on the vertical position of the second guide. During a media rewind operation, media 100 is biased against a tape spool flange 120 or 120'. This causes media 100 to be rewound more "neatly", without being staggerwrapped.

Figure 2:
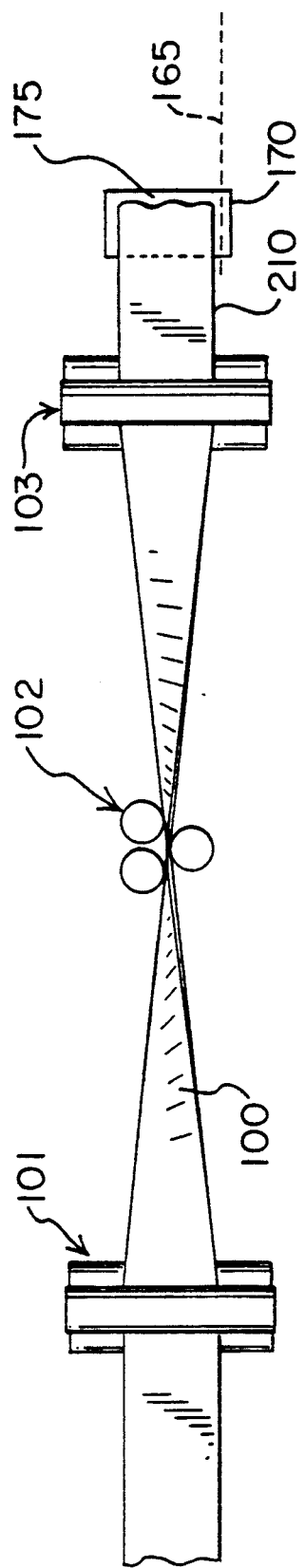
FIG. 2 is a front view illustrating the relationship of the media with respect to the media guides and a read/write head reference edge.
Figure 3:
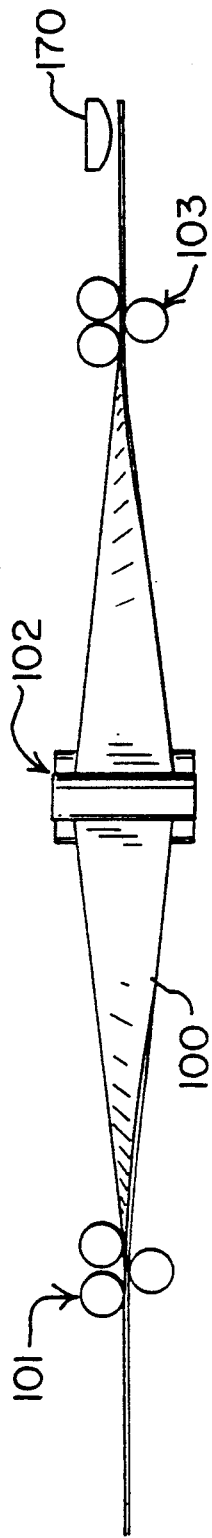
FIG. 3 is a top view showing the relationship between the guides, the media, and a read/write head.

FIG. 2 is a front view illustrating the relationship of media 100 with respect to guides 101, 102, 103 and a read/write head reference edge 165. FIG. 3 is a top view of the relationship shown in FIG. 2. As shown in FIG. 2, after passing through guides 102 and 103, media 100 is aligned at area 210 with respect to a reference edge 165 of read/write head 170.

Staggerwrap Problems Incurred By Prior Art Guides

Figure 4:
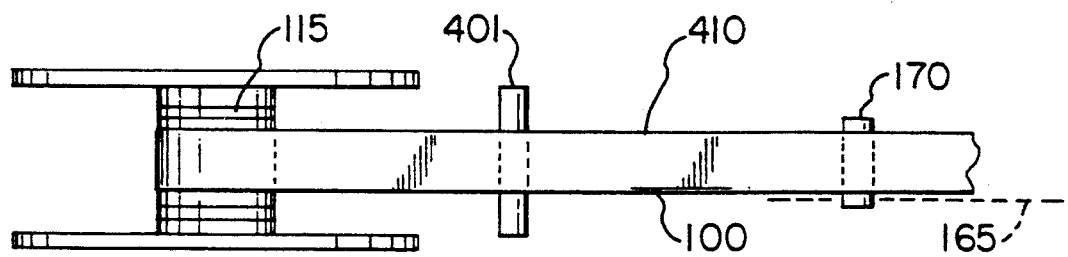
FIGS. 4 through 6 show the effect of staggerwrap in a prior art guide configuration.
Figure 5:
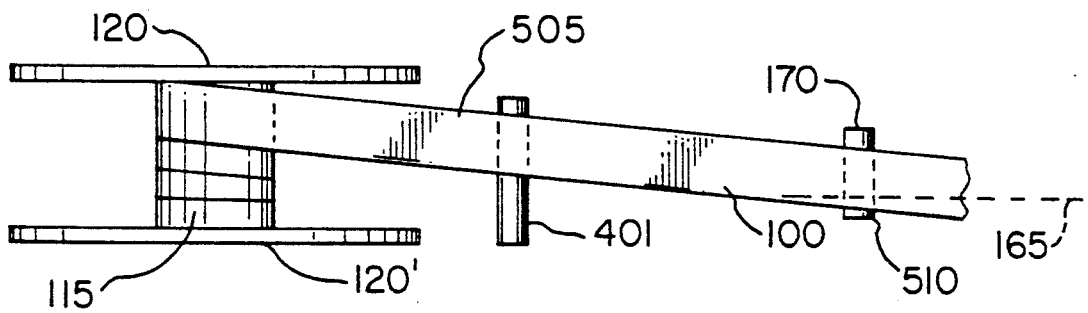
Figure 6:
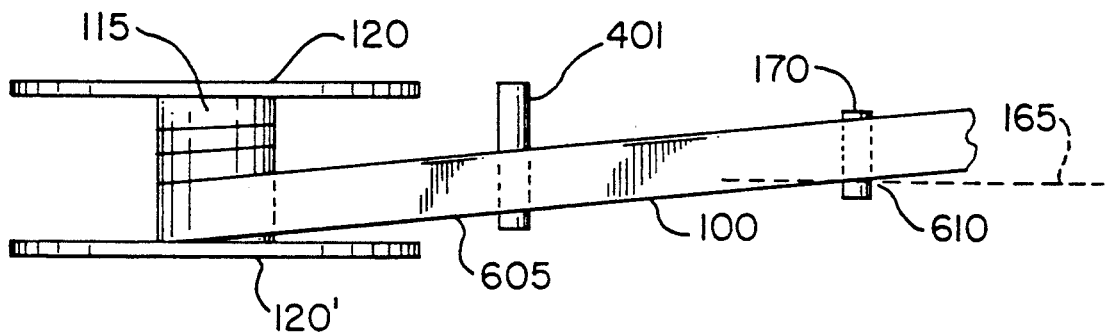

FIGS. 4 through 6 illustrate certain problems caused by staggerwrapped media 100 traveling through a prior art guide 401 which does not impart a twist to media 100. FIG. 4 illustrates an ideal situation wherein media 100 is positioned on tape spool 115 exactly in line with read/write head reference edge 165. Only in this specific instance is media 100 aligned with reference edge 165 when media 100 traveling through prior art guides reaches read/write head 170.

FIG. 5 illustrates a situation wherein media 100 is positioned "high" on tape spool 115, i.e., closer to flange 120 than to flange 120'. It can be seen that when media 100 reaches read/write head 170 at area 510, media 100 is below the desired position relative to the read/write head reference edge 165.

FIG. 6 illustrates a situation wherein media 100 is positioned "low" on tape spool 115, i.e., closer to flange 120' than to flange 120. It can be seen that when media 100 reaches the read/write head 170 at area 610, media 100 is above the desired position relative to the read/write head reference edge 165.

Staggerwrap Elimination By The Present Invention

Figure 7:
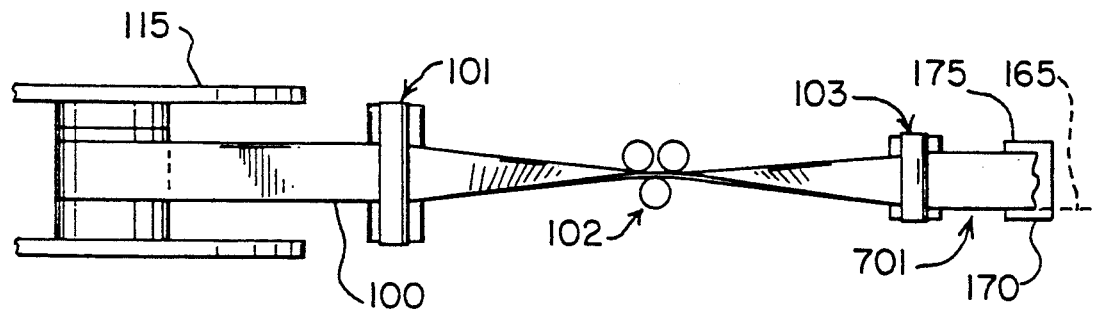
FIGS. 7 through 9 illustrate the elimination of staggerwrap effects where the guidance method of the present invention is used.
Figure 8:
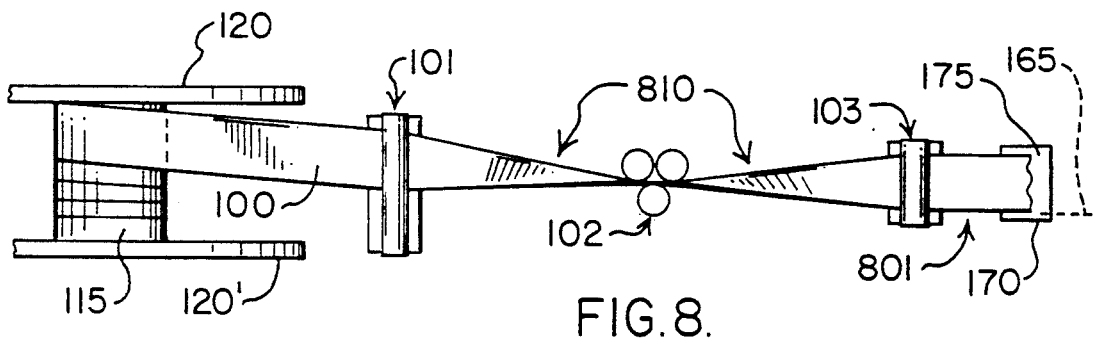
Figure 9:
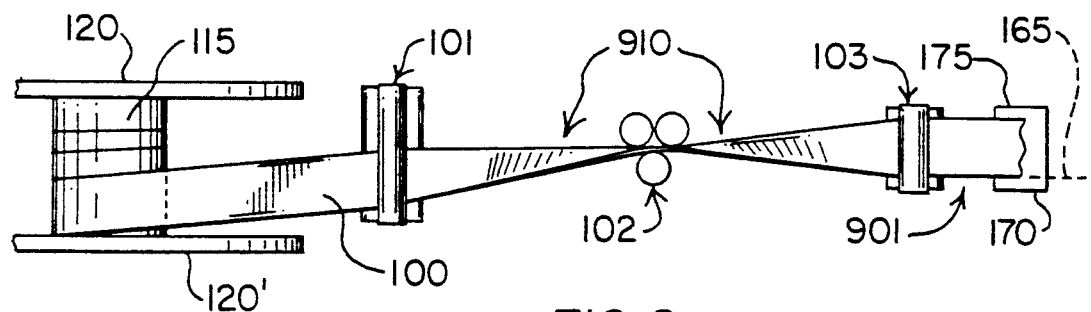

FIGS. 7 through 9 illustrate the elimination of staggerwrap effects where the guidance method and apparatus of the present invention is used. FIG. 7 shows a situation wherein media 100 is positioned on tape spool 115 in line with read/write head reference edge 165. In this situation, when media 100 reaches read/write head 170 at area 701, media 100 is aligned with read/write head reference edge 165.

FIG. 8 shows a situation wherein media 100 is positioned "high" on tape spool 115, i.e., closer to flange 120 than to flange 120'. Because of the twist imparted in area 810, when media 100 reaches read/write head 170 at area 801, media 100 is aligned with read/write head reference edge 165.

FIG. 9 shows a situation wherein media 100 is positioned "low" on tape spool 115, i.e., closer to flange 120' than to flange 120. Because of the twist imparted in area 910, when media 100 reaches read/write head 170 at area 901, media 100 is aligned with read/write head reference edge 165.

The method and apparatus of the present invention also functions to align other types of media 100 with a target surface 175 across which the media 100 passes. These other types of media 100 may include sheet or ribbon form materials having a planar surface 104 such as film, paper, or textiles.

It is to be expressly understood that the claimed invention is not to be limited to the description of the preferred embodiment but encompasses other modifications and alterations within the scope and spirit of the inventive concept.

I claim:

1. A method for aligning one edge of a media as it is unwound from a tape spool to a desired path of travel of said media across a tape transport read/write head, wherein said media has a planar surface positioned in a first axial orientation relative to the longitudinal axis of said desired path of travel, said method comprising the steps of:
   (a) unwinding said media from said tape spool so that said planar surface of said media is positioned in a second axial orientation substantially the same as said first axial orientation;
   (b) twisting said planar surface of said media to a third axial orientation at a first substantial angle co-axially relative to said second axial orientation; and
   (c) twisting said planar surface of said media to a fourth axial orientation at a second substantial angle co-axially relative to said third axial orientation wherein said media is parallel to a surface of said tape transport read/write head;
   wherein said fourth axial orientation is co-planar with said first axial orientation, so that said media travels in the same plane and in the same direction in both said first axial orientation and in said fourth axial orientation.

2. The method of claim 1, including the additional step of:
   guiding said media so that said one edge of said media is coincident with a desired reference line.

3. The method of claim 1, including the additional step of:
   guiding said media so that said one edge of said media is aligned with respect to a reference edge of said tape transport read/write head.

4. Apparatus for aligning one edge of a media being unwound form a tape spool to a desired path of travel of said media, wherein said media has a planar surface, said apparatus comprising:
   (a) first means for guiding said media from said tape spool on which said media is wound;
   (b) second means for guiding said media so that said planar surface of said media is twisted a first substantial angle in a first direction about a longitudinal axis of said path of travel;
   (c) third means for guiding said media so that said planar surface of said media is twisted a second substantial angle about said axis in a second direction opposite to said first direction to align said media with respect to said desired path of travel; and
   (d) fourth means for guiding said media so that said one edge of said media is coincident with a reference edge of a tape transport read/write head.

5. The apparatus of claim 4, wherein said first substantial angle and said second substantial angle are between 45 and 135 degrees.

6. The apparatus of claim 4, wherein said first means for guiding and said second means for guiding each comprise three cylindrical guide elements arranged in parallel in a triangular configuration wherein said media is guided between a base and a vertex of the triangle formed by said guide elements.

7. The apparatus of claim 4, wherein said first means for guiding and said second means for guiding comprises at least two guide elements arranged in parallel, and wherein said media is guided between said at least two guide elements.

* * * * *